US011165686B2

(12) United States Patent
Heidelberger et al.

(10) Patent No.: US 11,165,686 B2
(45) Date of Patent: Nov. 2, 2021

(54) SWITCH-CONNECTED DRAGONFLY NETWORK

(71) Applicant: International Business Machines Corporation, Armonk, NY (US)

(72) Inventors: Philip Heidelberger, Cortlandt Manor, NY (US); Dong Chen, Scarsdale, NY (US); Yutaka Sugawara, Eastchester, NY (US); Paul W. Coteus, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 16/057,015

(22) Filed: Aug. 7, 2018

(65) Prior Publication Data

US 2020/0053002 A1    Feb. 13, 2020

(51) Int. Cl.
*H04L 12/707*    (2013.01)
*H04L 12/727*    (2013.01)
(Continued)

(52) U.S. Cl.
CPC ............ *H04L 45/24* (2013.01); *H04L 45/121* (2013.01); *H04L 45/14* (2013.01); *H04L 49/1576* (2013.01)

(58) Field of Classification Search
CPC ...................................................... H04L 45/24
See application file for complete search history.

(56) References Cited

U.S. PATENT DOCUMENTS 5,859,981 A *  1/1999  Levin ...................... H04L 45/00
                                                    709/238
8,285,789 B2   10/2012  Abts et al.
(Continued)

FOREIGN PATENT DOCUMENTS

WO    WO2008147926 A1    12/2008

OTHER PUBLICATIONS

Heidelberger et al: An Evaluation of Network Architectures for Next Generation Supercomputers: ISBN (Electronic): 978-1-5090-5218-9 , Publication Date: Nov. 1, 2016 ;Electronic Publication Date: Jan. 30, 2017 (Year: 2016).*
Heidelberger et al: An Evaluation of Network Architectures for Next Generation Supercomputers: ISBN (Electronic): 978-1-5090-5218-9 , Publication Date: Nov. 1, 2016 ;Electronic Publication Date: Jan. 30, 2017 (Year: 2017).*
Reinemo, "Fat-trees and Dragonflies—A perspective on topologies", Simula Research Laboratory, HPC Advisory Council Switzerland Workshop, Mar. 15, 2012, 20 pages.

*Primary Examiner* — Kodzovi Acolatse
*Assistant Examiner* — Abdeltif Ajid
(74) *Attorney, Agent, or Firm* — Scully, Scott, Murphy & Presser, PC; Daniel P. Morris, Esq.

(57) ABSTRACT

A switch-connected dragonfly network and method of operating. A plurality of groups of row switches is organized according to multiple rows and columns, each row including multiple groups of row switches connected to form a two-level dragonfly network. A plurality of column switches interconnect groups of row switches along respective columns, a column switch associated with a corresponding group of row switches in a row. A switch port with a same logical port on a row switch at a same location in each group along the respective column connects to a same column switch. The switch-connected dragonfly network is expandable by adding additional rows, an added row comprising a two-level dragonfly network. A switch group of said added row associated with a column being connects to an available port at an existing column switch of said column by corresponding added S path link with no re-cabling of the switched network required.

18 Claims, 12 Drawing Sheets

(51) Int. Cl.
*H04L 12/721* (2013.01)
*H04L 12/933* (2013.01)

(56) References Cited

U.S. PATENT DOCUMENTS

| | | |
|---|---|---|
| 8,495,194 B1 | 7/2013 | Brar et al. |
| 8,837,517 B2 | 9/2014 | Marr et al. |
| 9,137,143 B2 | 9/2015 | Parker et al. |
| 9,699,067 B2 | 7/2017 | Haramaty et al. |
| 2013/0201994 A1* | 8/2013 | Beshai .................... H04L 45/44 370/401 |
| 2017/0187616 A1* | 6/2017 | Chen ........................ H04L 12/46 |
| 2017/0353401 A1 | 12/2017 | Kim et al. |

* cited by examiner

SWITCH-CONNECTED DRAGONFLY NETWORK

STATEMENT REGARDING FEDERALLY SPONSORED RESEARCH OF DEVELOPMENT

This invention was made with U.S. Government support under Contract. No. B601996 awarded by the Department of Energy. The government has certain rights to this invention.

FIELD

The present invention generally relates to improvements in Dragonfly-networks for multiprocessor/multi-node High Performance Computing (HPC) system, and particularly to a switch-connected Dragonfly network system and method of operating.

BACKGROUND

Dragonfly networks (see IBM's P7IH Torrent, Aries, Daly) are a cost effective way of building high performance large scale networks. If there are N endpoints, the cost is proportional to N, whereas in a fat-tree network the cost is proportional to N log(N).

However, it is difficult to grow a Dragonfly, unless one either under-populates the "D" links connecting the groups (resulting in a loss of bandwidth), or does extensive re-cabling as nodes are added to the system. Second, in an HPC environment, it is difficult to partition a large system into non-interfering smaller sub-systems while maintaining close to peak bisection bandwidth.

For example, in IBM's P7IH Torrent architecture, nodes are connected to switches that have local "L" links and global "D" links. The switches in a "Tier 1" group of nodes (called a "supernode") are fully connected by the L links (there is at least one L link between each switch) and the Tier 1 groups are connected by the D links (there is at least one D link between each pair of groups, or each pair of super nodes). There are two kinds of routes: direct routes which take the form of LDL hops (some of which may be missing) and indirect routes which take the form LDLDL which needed for fault tolerance and to improve performance for certain adversarial traffic patterns.

As an example, the bisection bandwidth is at most D/2 links worth of bandwidth per switch. (If the total L bandwidth is twice the total D bandwidth, the systems is balanced and the bisection is proportional to D/2 links). Consider now the case of G groups partitioned into G/2 sub-systems, or jobs, with 2 groups per job. For example groups 1 and 2 form the first job, groups 3 and 4 form the second job, etc. If nodes in group 1 only talk to nodes in group 2 via direct routes and there is only one D link between the groups in the maximum sized system, the bisection bandwidth is at most only 2 links worth (one link from group 1 to group 2 and 1 link from group 2 to group 1). If there are L "L" links D "D" links, with indirect routing the effective bisection bandwidth between groups 1 and 2 is as much as (L+1)*D links worth of bandwidth. There are (L+1)*D D links leaving group 1 but an indirect LDLDL path requires two D hops, cutting the bandwidth from group 1 to group 2 to (L+1)*D/2. Similarly, the bandwidth from group 2 to group 1 is (L+1)*D/2. However, now there is interference between the G/2 jobs, resulting in noise that can reduce scalability. This interference also leads to unpredictable run times and makes performance tuning more difficult.

SUMMARY

A switch-connected dragonfly network that addresses shortcomings of the Dragonfly network topology.

A switch-connected dragonfly network that is expandable without loss of bandwidth and, in a high performance computing HPC environment, able to be partitioned into non-interfering smaller sub-systems while maintaining close to peak bisection bandwidth.

In one aspect, there is provided a switching network. the switching network comprises: a plurality of groups of row switches organized according to multiple rows and columns, each row comprising multiple groups of row switches connected to form a two-level dragonfly network; a plurality of column switches for interconnecting groups of switch nodes along columns, one or more column switches associated with a corresponding group of switch nodes in a row, wherein for each group of switch nodes along a column, a switch port with a same logical port on a row switch at a same location in each group connects to a same column switch over a corresponding switch S path link.

In accordance with a further aspect of the invention, there is provided a method of operating a switching network. The method comprises: configuring, using a control element, row switch elements of a switching network to route one or more packets from a source row switch to a destination row switch, the switched network comprising: a plurality of groups of row switches organized according to multiple rows and columns, each row comprising multiple groups of row switches connected to form a two-level dragonfly network; a plurality of column switches for interconnecting groups of switch nodes along columns, one or more column switches associated with a corresponding group of switch nodes in a row, wherein for each group of switch nodes along a column, a switch port with a same logical port on a row switch at a same location in each group connects to a same column switch over a corresponding switch S path link, and routing one or more packets from the source row switch to the destination row switch over one of: a direct route or an indirect route, the routing over the direct or indirect routes including routing through one or more the column switches over corresponding switch S path links.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

In one aspect, there is provided a switched-dragonfly network architecture connecting rows of 2-Level dragonfly networks via column switches. This architecture provides a dragonfly-like network with modular growth and partitionability and higher scalability.

As known, a "Dragonfly" network topology employs a group of routers or switches connected into a subnetwork as one very high radix virtual router. This very high effective radix in turn permits building a network in which all minimal routes traverse at most one global channel.

FIG. 1 depicts a network block diagram that schematically illustrates a switched-Dragonfly network 100 in accordance with an embodiment of the invention where each row of the network is a Dragonfly topology. In an embodiment, the Dragonfly topology is constructed in two levels: In the first level, a supernode or "group" 105 of interconnected row switches, i.e., "first level" switches 110, forms a virtual high-port-count (radix) switch. In the second level, such groups 105 are connected to one another in a full graph topology. A configuration of a "Dragonfly" network is well-known in the art, e.g., see International Business Machine's Torrent™ network architecture embodied in the IBM Power 7IH high-performance computing system.

Figure 1A:
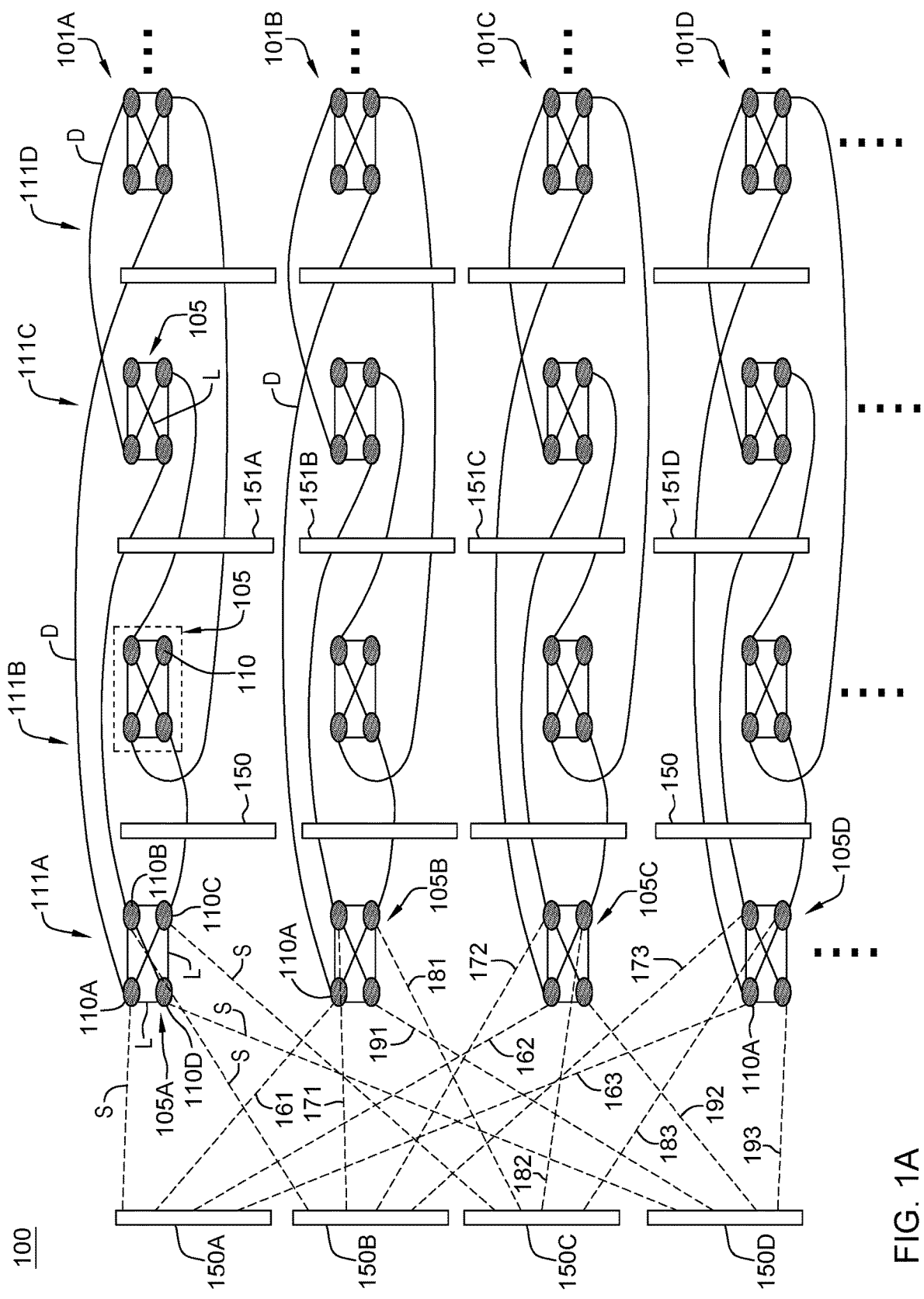
FIG. 1A depicts a network block diagram that schematically illustrates a switch-connected Dragonfly network, in accordance with an embodiment of the present invention.

With more particularity, FIG. 1A shows one embodiment of a switched-dragonfly network architecture 100 including row switches 110 arranged into and with the rows connected to one another via the S ports and "column" (or "second level") switches. As shown, the network includes multiple rows 101A, 101B, 101C, 101D, . . . etc., each row having multiple switching groups 105, each group 105 being a one-level all-to-all interconnection of row switches 110, each row switch 110 within a group 105 inter-connected by local physical links L providing uni- or bi-directional communication of packets. Links L may include electrical or optical fiber cabling. Assemblies or groups 105 of switches are additionally interconnected via global links D. As further shown in FIG. 1A, the switched-dragonfly network architecture 100 includes multiple columns 111A, 111B, 111C, 111D, . . . etc. of switching supernodes or groups 105. For example, column 111A includes row switching groups 105A, 105B, 105C, 105D, . . . , etc., corresponding to associated rows 101A, 101B, 101C, 101D, . . . etc. Each respective column 111A, 111B, 111C, 111D also includes an associated respective column of switches 150 such as column switches 150A, . . . , 150D, etc. provided at column 111A for providing an interconnecting hop for packet communications to row switches at groups of different rows. In one embodiment, each column switch 150A, . . . , 150D may include a single level crossbar switch.

As shown in the non-limiting embodiment of FIG. 1A, a supernode or group 105 of row switches in any row/column may include four row switch elements 110A, 110B, 110C, 110D fully connected to each other by the (L) link 112, where there is at least one L link connecting ports between each switch 110 of the group. The Tier 1 groups are connected by the (D) link 120 (there is at least one D link between each pair of groups, or each pair of super nodes). Thus, with only first column 111A connections shown, a switch 110A will have 3L, 1D (for connecting to another group along the row) and 1S port for connecting to its column switch 150A.

In one embodiment, each switch 110 of a group may include multiple S ports for connections to multiple planes of column switches 150. For example, as shown in FIG. 1A, there is a single plane S=1 of column switches per column of switch groups (e.g., column switches 150A, . . . , 150D associated with column 111A). However, with multiple S ports, each switch can connect to multiple planes of single level crossbar column switches. Providing multiple S ports will increase/improve fault tolerance and bandwidth. For example, as shown in FIGS. 1B-1E, one or more additional planes of column switches, i.e., S>1, may be associated with a single column of row switch groups. In a configuration with an additional plane(s) of column switches, additional S link ports at a row switch can link the row switch to multiple column switch planes to increase network bandwidth and fault tolerance.

FIGS. 1B-1E each depict a network block diagram that schematically depicts a switch-connected Dragonfly network including an arbitrary number of column switch planes, in accordance with an embodiment of the present invention.

Figure 1B:
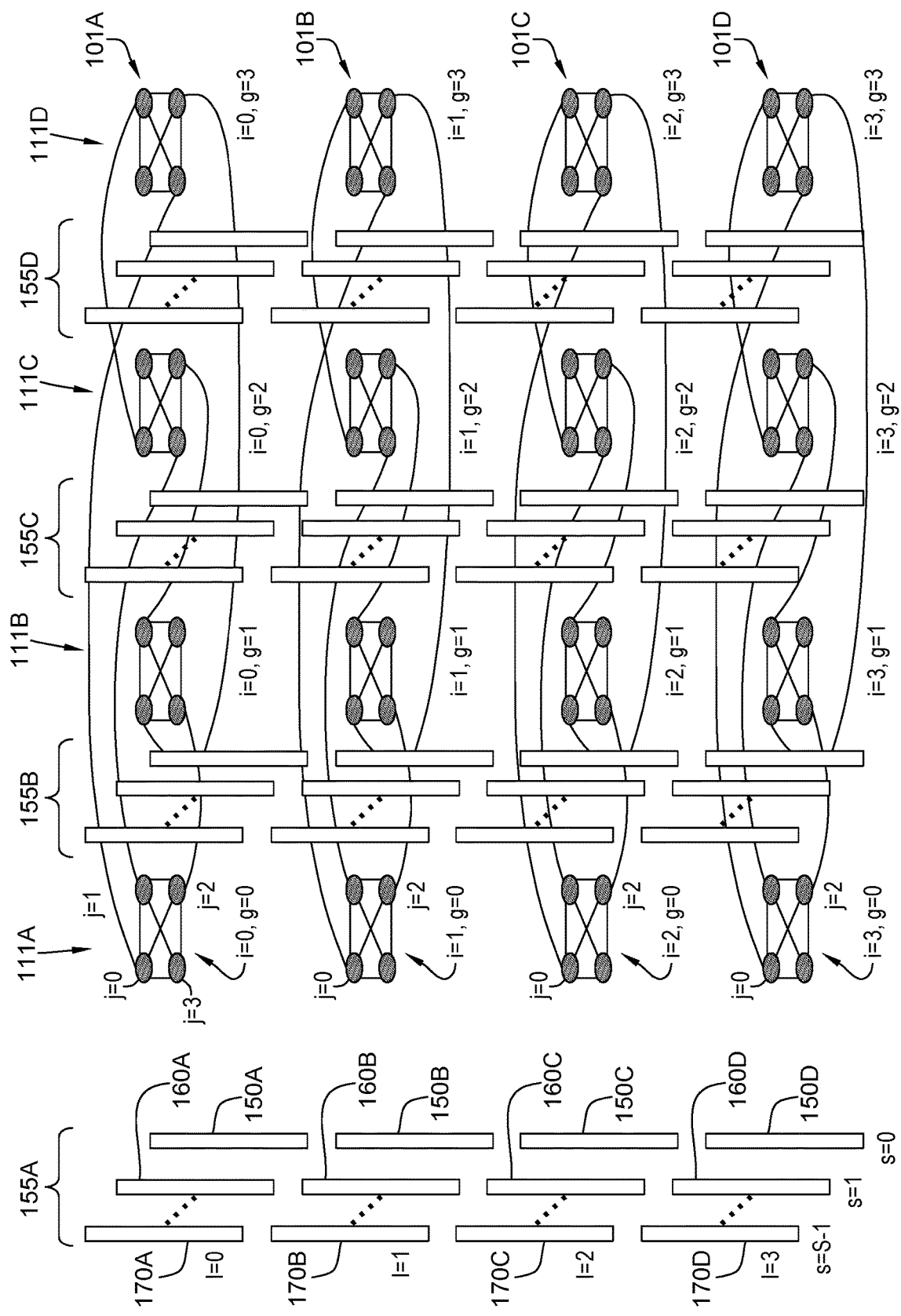
FIGS. 1B-1E depict a network block diagram that schematically illustrates a switch-connected Dragonfly network including an arbitrary number of column switch planes, in accordance with an embodiment of the present invention.

FIG. 1B shows an example configuration of additional planes of column switches for each respective column 111A-111D of row switch groups in the Dragonfly described in connection with FIG. 1A. That is, besides the column switches 150A-150D forming a single plane (S=1) of column switches associated with column 111A of row switch groups 105A-105D, in one embodiment, there are provided additional planes of column switches 155A, in parallel, resulting in S>1 planes of column switches for each group of row switches. As shown in FIG. 1B, the an arbitrary number of planes "s" of column switches are provided and labeled s=0, s=1, . . . s=S−1, where S is a total number of planes of column switches. Further in the example of FIG. 1B, L=3 and D=1. In notation shown in FIG. 1B, a row switch of a group is identified as switch "j", with a row switch j identified as j=0, 1, 2, 3 in a corresponding row "i" group "g" of a column, e.g., rows i=0, 1, 2, 3, groups g=0 in column 111A as shown in FIG. 1B. Thus, besides column switches 150A-150D forming a single plane S=1, additional parallel-oriented planes of column switches 160A-160D (s=1) and 170A-170D (s=S−1) provide for additional connection choices amongst nodes in the network to increase network bandwidth (i.e., S>1). In one embodiment, in any column switch plane, e.g., s=0, s=1, . . . , multiple column switches are identified with a label "l", where l=0, 1, . . . is the size of the first level row switch group, i.e., number of row switches in one group i=0, g=0 for example as well as any other groups in the embodiment of FIG. 1B. Any column switch "C" is thus identified by a triplet C(g, l, s). In the embodiment depicted, additional planes 155B of column switches (S>1) is shown associated with groups of row switches in column 111B, additional planes 155C of column switches (S>1) is shown associated with groups of row switches in column 111C, and additional planes 155D of column switches (S>1) is shown associated with groups of row switches in column 111D. In one embodiment, there is no limit to the amount of parallel oriented planes of switches 155A-155D for any respective column.

In the switched-dragonfly network architecture 100 of FIG. 1A, associated with each row switch group 105 in any row is a corresponding column switch 150 having switching ports providing packet communication links S to corresponding row switches of each of multiple switching groups along a same column of row switches. That is, a switch port with a same logical port number on a row switch at a same location in each group connects to a same column switch over a corresponding switch S path link. For instance, in view of FIG. 1A, first column 111A includes groups 105A, 105B, 105C, 105D in each row associated with the respective column switch 150A, 150B, 150C, 150D. Switch 110A of group 105A is shown connected via link "S" to a corresponding switch port of column switch 150A. Column switch 150A also provides an (S) link 161 for connecting to corresponding S link port at switch 110A of group 105B in the next row 101B in the column 111A. Column switch 150A additionally provides an (S) link connection 162 to a corresponding switch port at row switch 110A of group 105C in the next row 101C in the column 111A and provides an (S) link connection 163 to a corresponding S link port at row switch 110A of group 105D (not shown) in the next row 101D.

As further shown in column 111A of FIG. 1A, row switch 110B of group 105A is connected via (S) link to a switch port of column switch 150B. Column switch 150B also provides a switch port with an (S) link connection 171 to corresponding port at row switch 110B of group 105B in the next row 101B in the column 111A. Column switch 150B additionally provides a switch port with (S) link connection 172 to corresponding S link port at row switch 110B of group 105C in the next row 101C in the column 111A and provides a port/(S) link connection 173 to corresponding S link port at row switch 110B of group 105D in the row 101D.

A similar pattern of (S) links connecting corresponding nodes to each of corresponding nodes of remaining groups in the same column follows for each consecutive switch of the column switches 150A-150D. For example, in column 111A of FIG. 1A, row switch 110C of group 105A is connected via (S) link to a switch port of column switch 150C. Column switch 150C also provides ports with corresponding (S) link connections 181,182,183 to corresponding row switch 110C of respective groups 105B, 105C and 105D in the next successive rows 101B, 101C and 101D in the column 111A. Similarly, row switch 110D of group 105A is connected via (S) link to a switch port of column switch 150D. Column switch 150D also provides switch ports with corresponding (S) link connections 191, 192, 193 to ports at corresponding row switches 110D of groups 105B, 105C and 105D in the next successive rows 101B, 101C and 101D in the column 111A.

It is understood that, likewise, groups of switches 105 along a column, e.g., column 111B, 111C, 111D are connected to a corresponding plane of column switches in likewise manner as groups of switches in column 111A. For example, switch groups 105 along column 111C will connect to its corresponding column switch 151A, . . . , 151D in like manner as row switch groups 105A-105D connect to column switches 150A-150D in FIG. 1A.

Figure 1C:
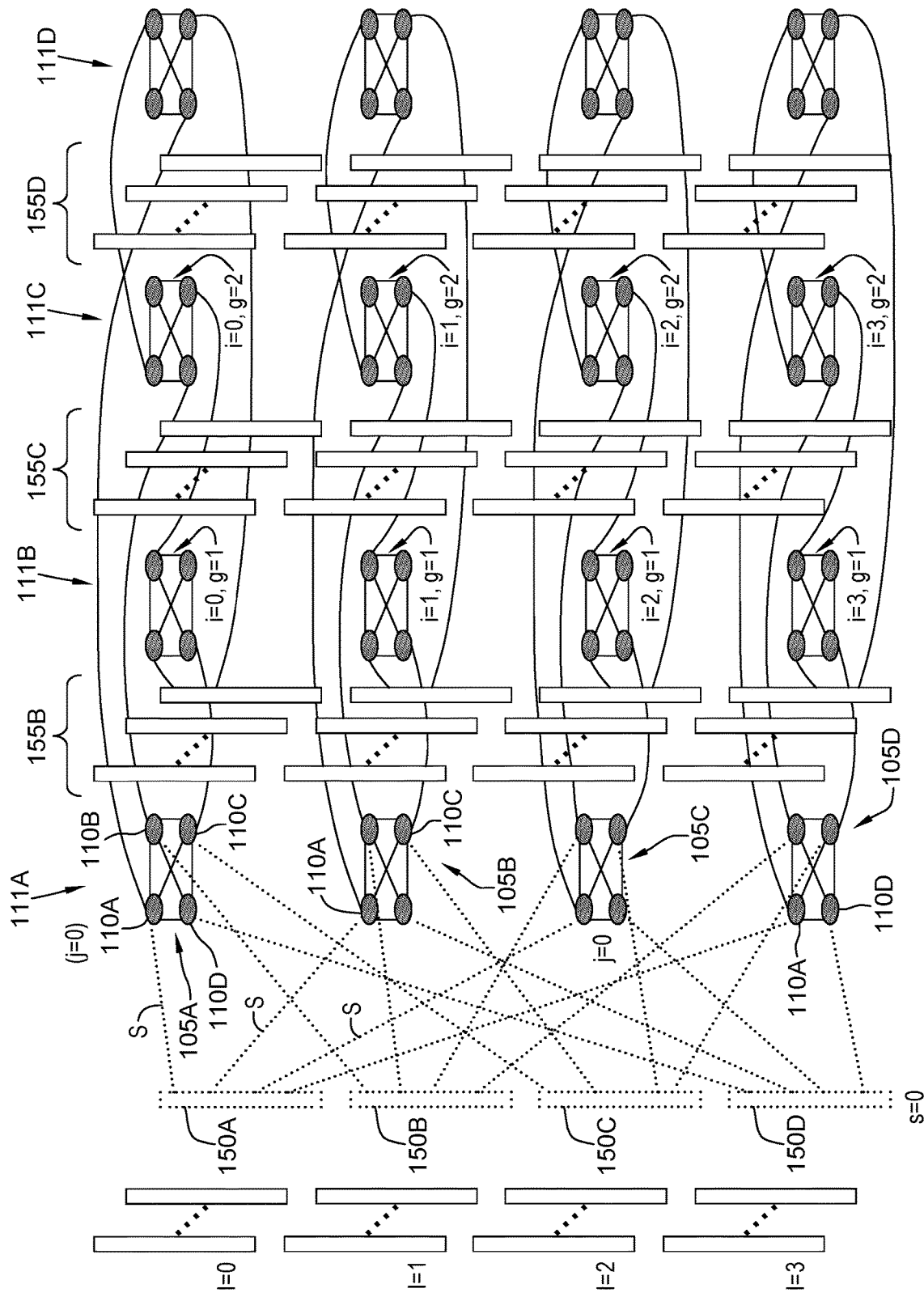

FIG. 1C shows an example configuration of S-link connections between s=0 plane of column switches and groups of row switches 105A-105D in column 111A as shown as in the example configuration of FIG. 1A. As in the embodiment of FIG. 1A, a first column switch 150A (l=0) is shown connecting, over S-links, to corresponding switch ports with a same logical port (for example, S port number 0) on a row switch at a same location in each group 105A, . . . , 105D. For example, column switch 150A provide S-port switches that connect switch 150A to a like row switch 110A (j=0) in each group 105A-105D of column 111A. Column switch 150B (l=1) provide S-port switches that connect switch 150B to a like row switch 110B (j=1) in each group 105A-105D (i.e., group g=0 in rows i=0 to i=3) of column 111A. An identical configuration pattern follows for column switch 150C (l=2) connections with like row switches 110C (j=2) in each group 105A-105D of column 111A and for column switch 150D (l=3) connections with like row switches 110D (j=3) in each group 105A-105D of column 111A. It is understood that an identical pattern of S-link connections are provided for parallel planes of column switches 155B for connecting to row switches of respective row switches in group 1 in column 111B (i.e., group g=1 in rows i=0 to i=3), and for parallel planes 155C of column switches for connecting to row switches of respective row switches in group 2 (i.e., group g=2 in rows i=0 to i=3) in column 111C, and for parallel planes 155D of column switches for connecting to row switches of respective row switches in group 3 in column 111D.

Figure 1D:
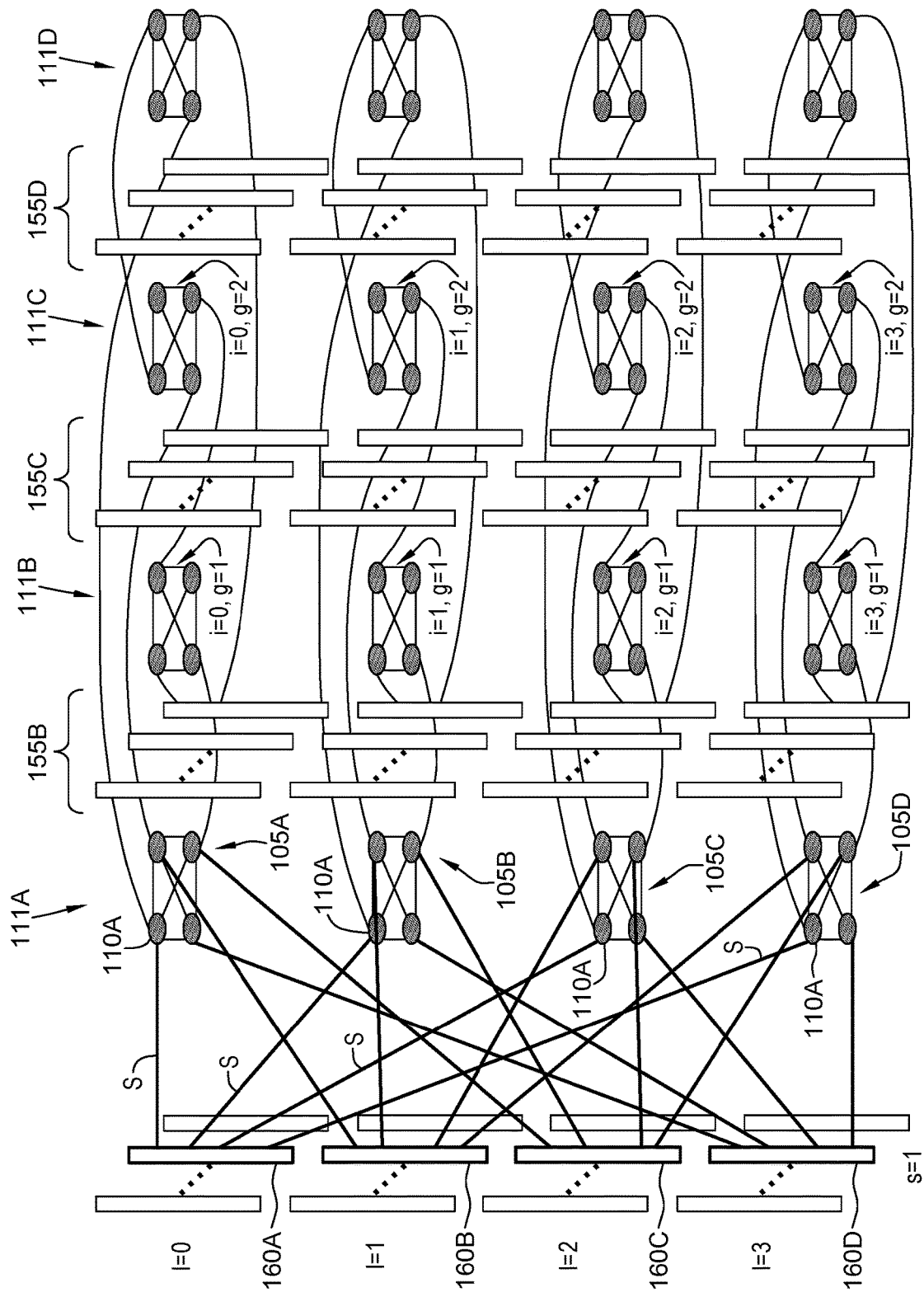

FIG. 1D shows a similar configuration of S-link connections between a second plane (s=1 plane) of column switches and row switches at the groups of row switches 105A-105D in column 111A. In this embodiment, the s=1 parallel plane of column switches 160A-160D connect to groups 105A-105D of row switches along column 111A. For example, similar to the embodiment of FIG. 1C, column switch 160A (l=0) is shown connecting, over S-links, to a corresponding switch port with a same logical port (for example, S port number 1) on a row switch at a same location in each group 105A-105D (i.e., group g=0 in rows i=0 to i=3). For example, column switch 160A (l=0) provide S-port switches that provide an S-link to connect column switch 160A to a like row switch 110A (j=0) in each respective group 105A-105D (i.e., group g=0 in rows i=0 to i=3) of column 111A. Column switch 160B (l=1) provides S-port switches that provide S-links that connect switch 160B to a like row switch 110B (j=1) in each respective group 105A-105D of column 111A. An identical connection configuration pattern follows for column switch 160C (l=2) where port connections are provided with S-links that connect like row switches 110C (j=2) in each respective group 105A-105D of column 111A, and for column switch 160D (l=3) connections with like row switches 110D (j=3) in each group 105A-105D of column 111A. It is understood that an identical pattern of S-link configurations are provided for connecting planes (s=1, . . . s=S−1) of parallel column switches 155B to like switches of respective groups of row switches in group 1, rows 0 to 3 in column 111B, and for connecting each plane of parallel column switches 155C to like switches of respective groups of row switches (g=2 in rows 0 to 3) in column 111C, and for connecting each plane of parallel column switches 155D to like switches of respective groups of row switches (g=3, rows 0 to 3) in column 111D.

Figure 1E:
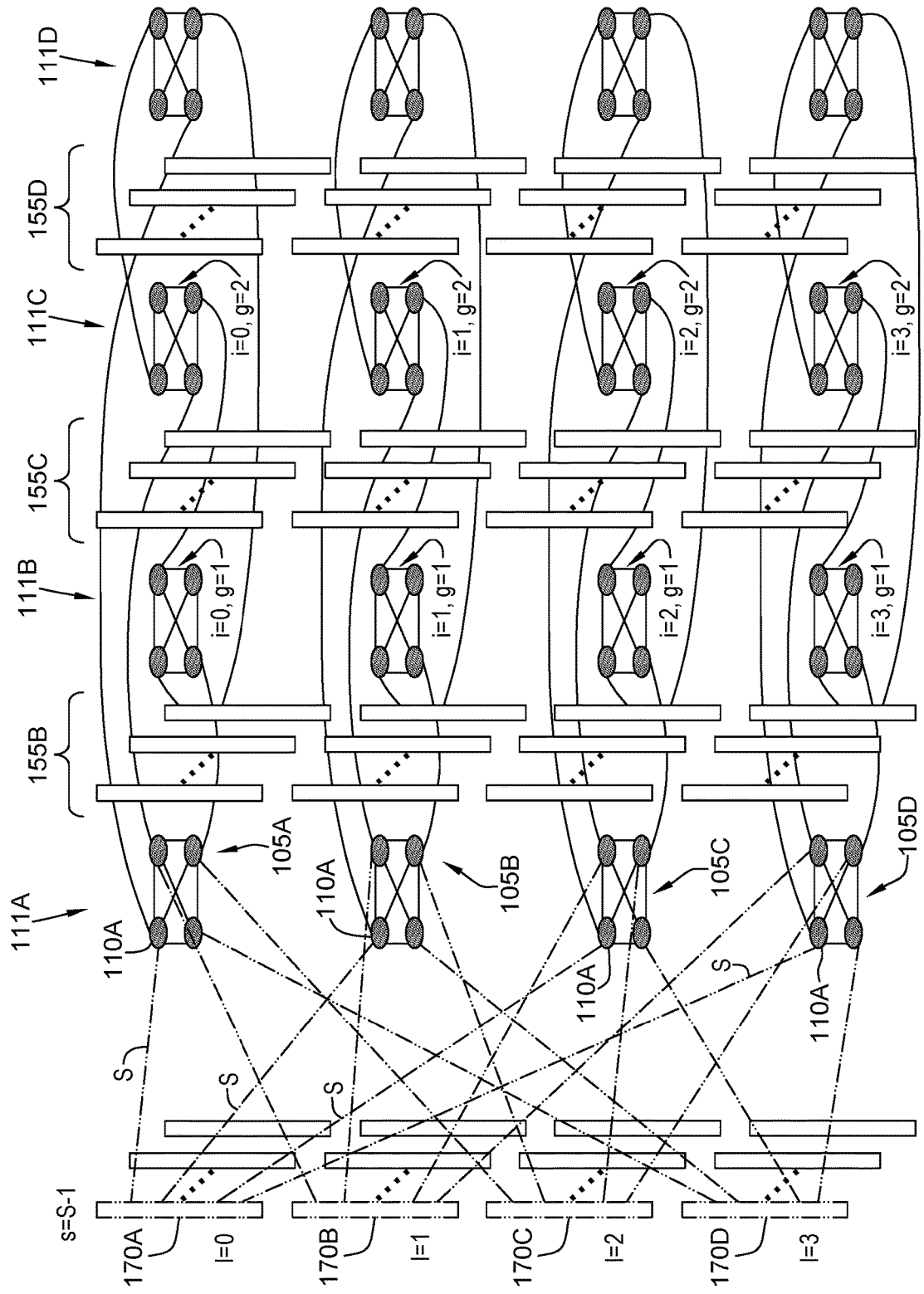

FIG. 1E shows a similar configuration of S-link connections between a final parallel plane (plane s=S−1) of column switch connections and row switches at the groups of row switches 105A-105D in column 111A. In this embodiment, the s=S−1 parallel plane of column switches 170A-170D connect to groups 105A-105D of row switches along column 111A. For example, similar to the embodiments of FIGS. 1C-1D, column switch 170A (l=0) is shown connecting, over S-links, to a corresponding switch port with a same logical port (port number S−1) on a row switch at a same location in each respective group 105A-105D (i.e., group g=0 in rows 0 to 3). For example, column switch 170A (l=0) provide S-port switches that provide an S-link to connect column switch 170A to a like row switch 110A (j=0) in each respective group 105A-105D (i.e., group g=0 in rows 0 to 3) of column 111A. Column switch 170B (l=1) provides S-port switches that provide S-links to connect switch 170B to a like row switch 110B (j=1) in each respective group 105A-105D of column 111A. An identical connection configuration pattern follows for column switch 170C (l=2) where port connections are provided with S-links that connect like row switches 110C (j=2) in each respective group 105A-105D of column 111A, and for column switch 170D (l=3) providing S-link connections to like row switches 110D (j=3) in each group 105A-105D of column 111A. It is understood that an identical pattern of S-link configurations are provided for connecting planes (s=1, . . . , s=S−1) of parallel column switches 155B to like switches of respective group g=1 in rows 0 to 3 of row switches in column 111B, and for connecting each plane of parallel column switches 155C to like switches of respective groups of row switches (g=2, rows i=0 to i=3) in column 111C, and for connecting each plane of parallel column switches 155D to like switches of respective groups of row switches in column 111D (g=3, rows i=0 to i=3).

Figure 2A:
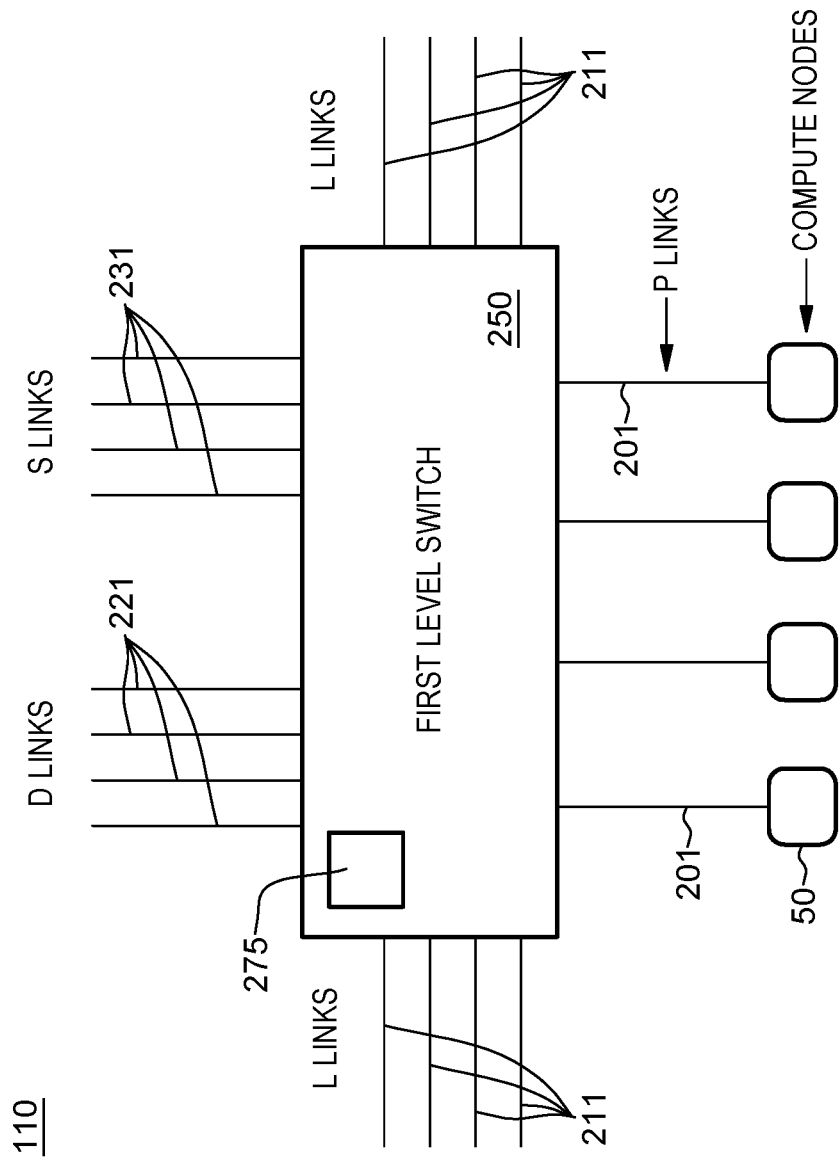
FIG. 2A shows an example router or row switch for providing routing of packets to compute nodes at ports associated with other switches according to one embodiment.

FIG. 2A shows an example router or switch 110 for providing routing of packets to ports at other switches by traversing direct or indirect routes of the switched network 100 according embodiments depicted in FIGS. 1A-1E. Each router or switch 110 may have a total of T ports that may be flexibly configured to include: processor ports (P ports) including (bi-directional) input/output ports 201 (or alternatively separate input ports and corresponding output ports) providing links for directly connecting to respective processor devices 50 (e.g., computing nodes); local ports (L ports) including (bi-directional) input/output ports 211 (or alternatively separate input ports and corresponding output ports) providing links for connecting to switches within a group; global ports (D ports) including (bi-directional) input/output ports 221 (or alternatively separate input ports and corresponding output ports) providing links for connecting groups of switches along a row; and switch ports (S ports) including (bi-directional) input/output ports 231 (or alternatively separate input S ports and corresponding output S ports) providing links for connecting the switch 110 to a column switch 150. As shown, a crossbar switch 250 is a first level switch controlled by a controller 275 for providing switch routing configurations for routing packets to/from any I/O port 201, 211, 221 and 231 of the switch 110.

In the embodiment of FIG. 2A, each P port, L port, D port and S port is a single I/O port for providing bi-directional communications via respective P, L, D and S links, however it is understood that separate corresponding input and output links may be provided. Further, switch ports 201, 211, 221 and 231, may have associated multiple receive buffers (i.e., virtual channels) configured for deadlock avoidance.

In a non-limiting example, an S switch may be configured to connect to a single or multi-level fat tree (e.g., which may be built from the same switch or router chip). As an example, for a supernode or group having thirteen (13) switches, an individual switch (not shown) may include a 32 port switch with 8 processor ports P, 12 link ports L, 6 global ports D and 6 switch S ports all of the same bandwidth.

Within a row, the topology is a 2-Tier dragonfly with L links, D links, and P processor connections. The row can scale up to approximately $(L+1)^2 \cdot D \cdot P$ processors, assuming each processor has a single port into the network. Each switch also has S ports into column switches. When configured as a single level fat-tree, the switches in the rows are connected by S parallel planes of column switches. For example, in FIG. 1, column switch 150A has multiple (or a total of T) column switch ports, such that column switch 150A connects to a different 110A switch along its column, but a different column switch at a different column connects to different S ports on each switch 110A of a group along its respective column. The total number of switch ports T=L+D+S+P, which is the same for both column and row switches. On row switches, the ports are separated into L, D, S, P, . . . types. On a column switch, all ports are the same, connecting to row switches. With a single level fat tree T such rows may be connected. For example, with T=32, P=8, L=12, D=6 and S=6, a row scales to $13^2*6*8=8112$ processors while the entire system scales to 32*8112=259,584 processors (alternately referred to herein as "sockets", compute "nodes" or symmetric multiprocessors (SMPs)).

In one embodiment, the column switches 150 comprise a two-level fat tree with T ports/switch enabling the system to scale to $T^2/2$ rows. If, in another embodiment, the system is built from two-way SMPs, and each socket in the SMP has a port into the network, then this configuration consists of two planes of Switch-Connected Dragonfly networks which potentially doubles the maximum size of the system. An advantage of this topology is that if the rows are of much less length than the maximum row size, then there are many direct paths between each group in the row. For example, if P=8, L=11 and D=6, there are 12 routers per group and a total 72 (=6*12) D links coming out of each group. If there are 12 groups in the row (and thus 12*12*8=1152 processors in the row), there are then 6 D links between each pair of groups (and correspondingly 6 direct paths between each group). If there are up to 32 rows, the system scales to up to 36,864 processor (compute nodes).

Figure 3:
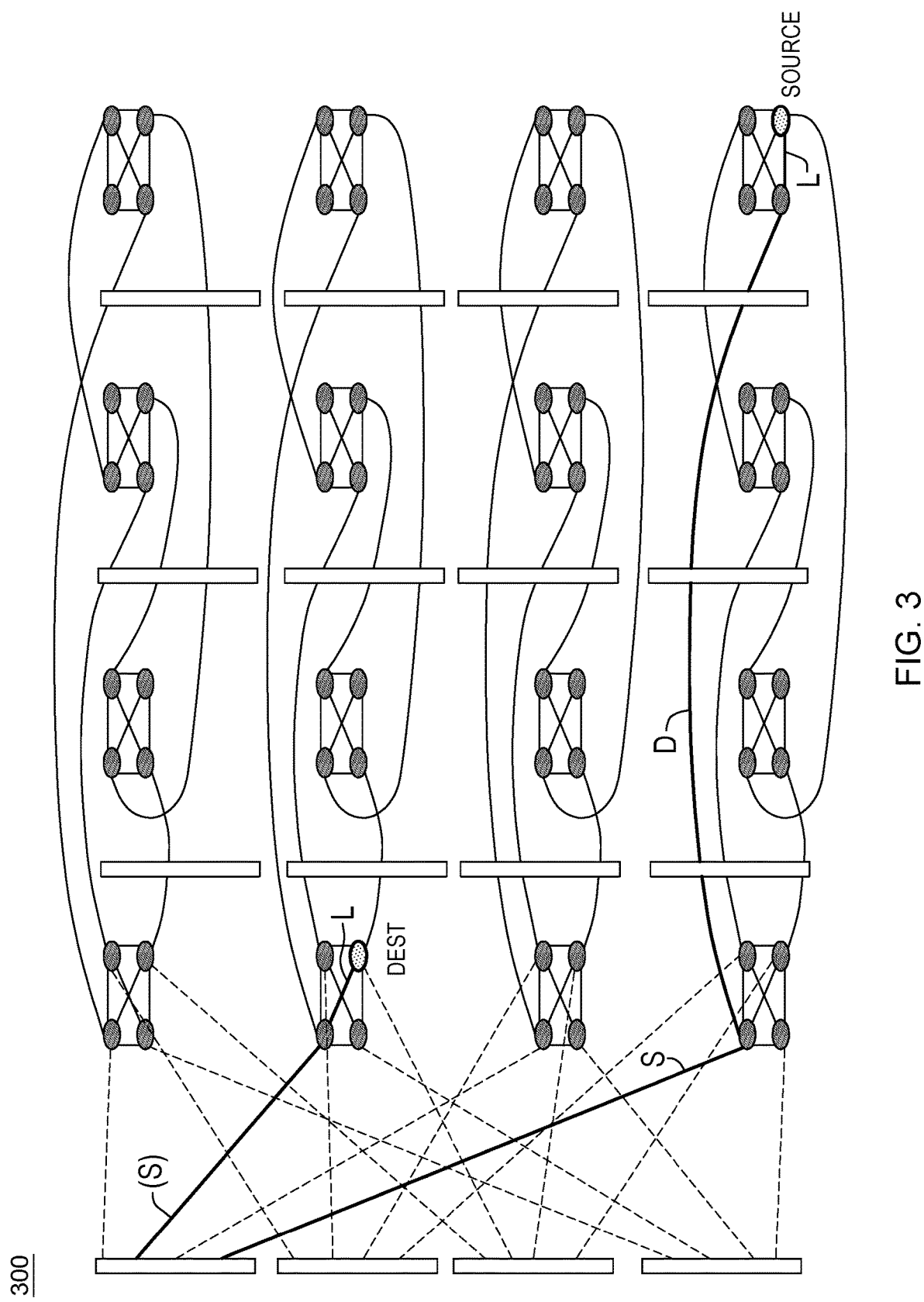
FIG. 3 depicts a row first direct route taking the form of LDSL link hops in the switch-connected Dragonfly network of FIG. 1 in one embodiment.
Figure 4:
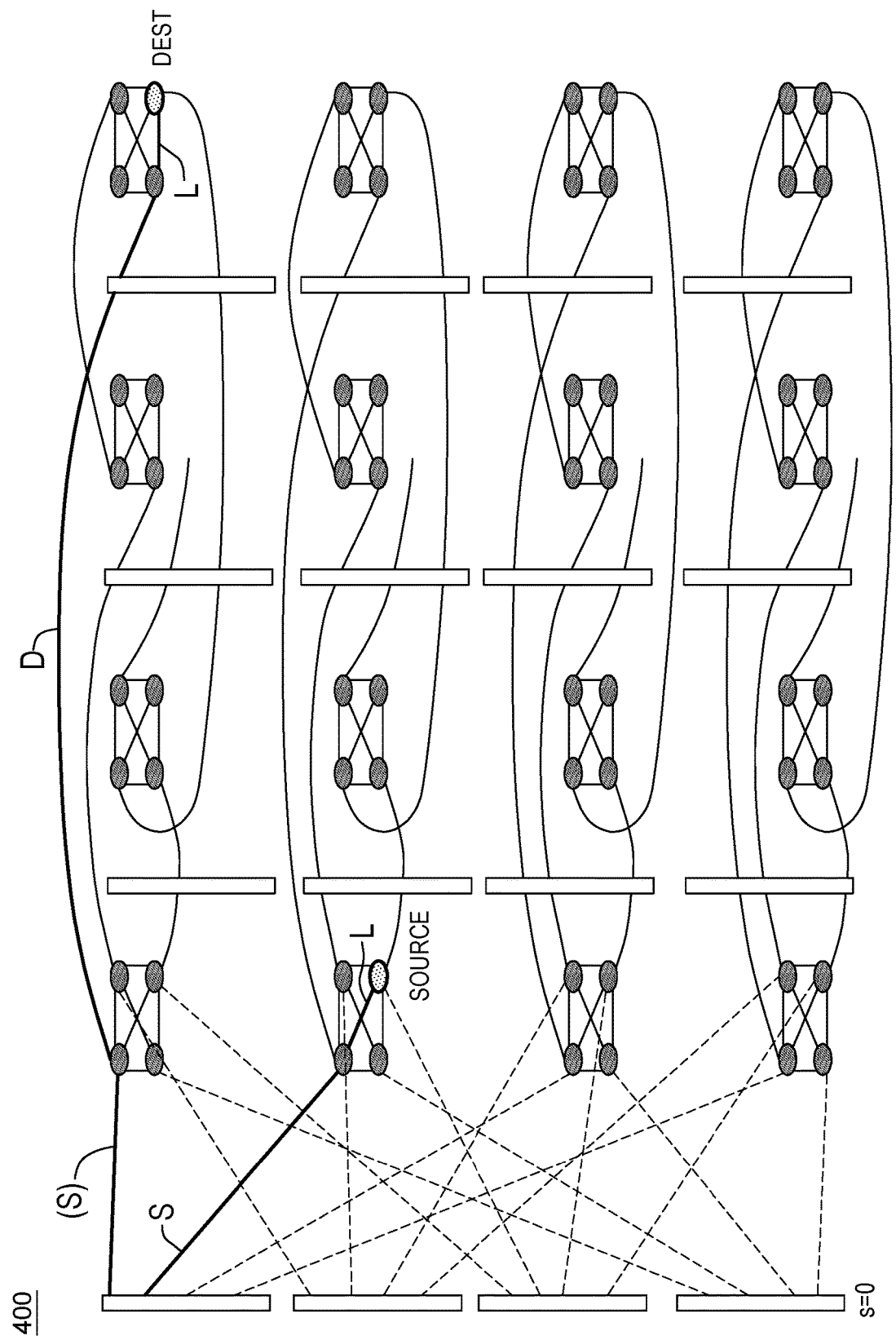
FIG. 4 depicts a column first direct route taking the form of LSDL link hops in the switch-connected Dragonfly network of FIG. 1 in one embodiment.

There are two kinds of routes: direct routes and indirect routes. Both direct and indirect routing is from a source compute node to a destination compute node (i.e., starts from a processor (compute node) and a P link at one row switch to another processor (compute node) at another row switch through a P link). Thus, for example, direct routing is a path traversing PLDLP links and indirect routing is a path traversing PLDLDLP. Since the first and the last P network hops between compute node and first level switches are common, it is being ignored for purposes of description. Characteristic of direct routing is a route including one switch S hop and one D hops for routing packets from a source to a destination node. For example, direct routes may take the form of LDSL hops and LSDL hops. In one embodiment, as shown in FIG. 3, for LDSL hops over a row first direct route 300, the network is configured to forward packets from a processor connected to a source node (source) over an L link hop, a D link hop, an S link (2 hops) and over an L link hop to the destination node having a processor connected to the destination node for a total of 5 hops. Similarly, as shown in FIG. 4, an LSDL column first direct route 302, the network 100 is configured to forward packets from a source node over an L link, an S link (2 hops), an D link and an L Link to the destination node. The direct route along a row or column may include a total of 5 hops (each S is 2 hops, one from router to column switch, one from column switch to router).

More generally direct routes may include traversing a series of links in an LDLSL order, e.g., packets traversing on a path from a processor connected at a source node over an L link hop, a D link hop, an L link hop, an S link and (2 hops) and L Link hop. Alternatively, direct routes may include traversing links in an LSLDL order, e.g., packets at a source node traversing on a path over an L link hop, an S link (2 hops), an L link hop, a D link hop and L Link hop to the destination node. In this embodiment, the extra "L" hop may not be needed since, e.g., in row first, can go from D directly to S to change rows.

In an example embodiment, when implementing nodes having 8P, 12L, 6D, 6S: the switch is balanced between L and D (and S bandwidth). This results in: 6 links all-to-all bandwidth per switch, ¾ (=6/8) links all-to-all per socket, i.e., ¾ the all-to-all bandwidth compared to a prior art configuration of an 8P, 16L, 8D two-Level (2-Tier) dragon-fly.

In one embodiment, indirect routing of packets between source and destination switches in network 100 requires a configuration of switches and cabling for increased fault tolerance and improved performance for certain adversarial traffic patterns.

Figure 5:
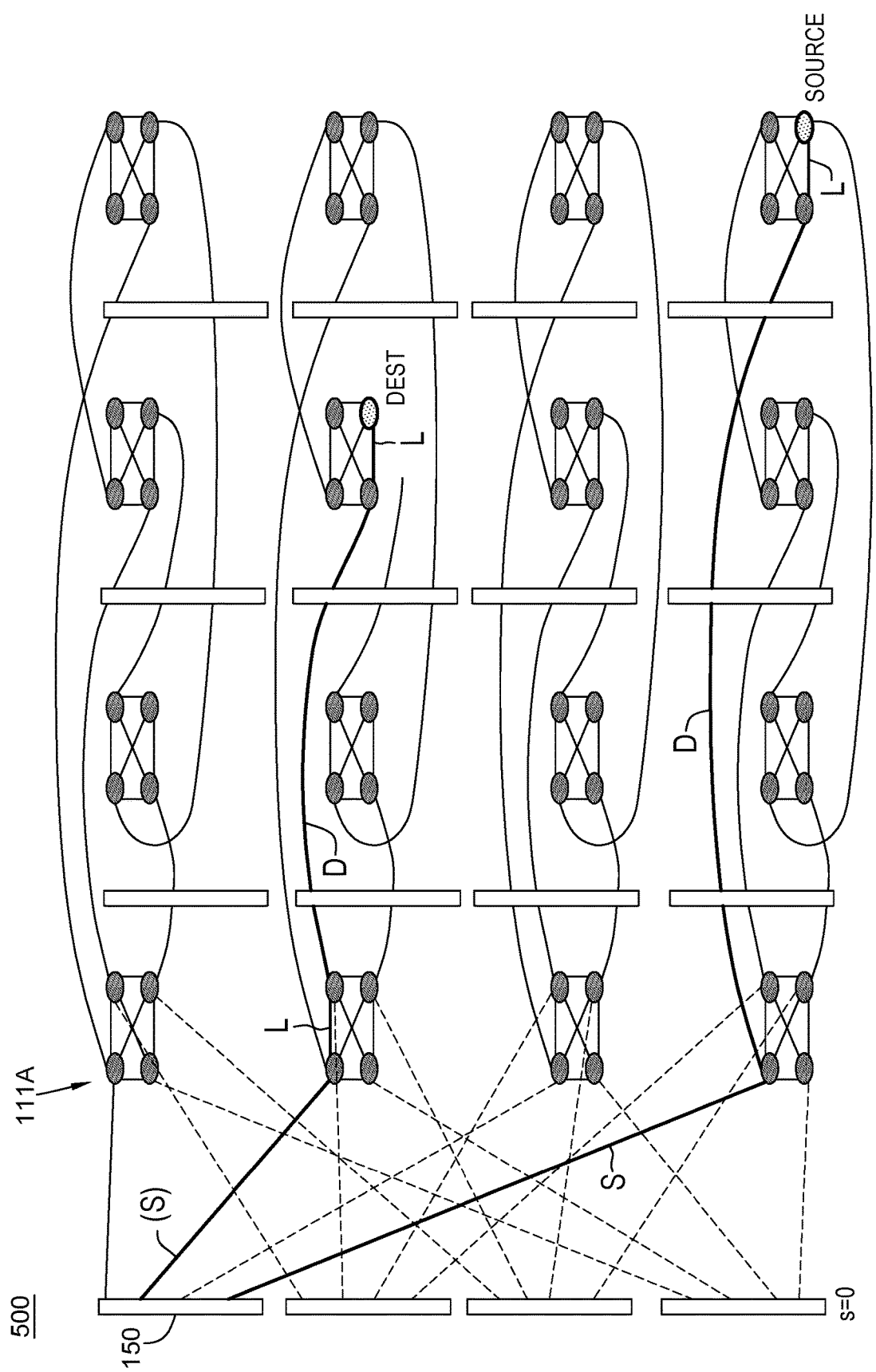
FIG. 5 depicts a first indirect route that includes 2 D link hops and 1 S link hop in the switch-connected Dragonfly network of FIG. 1 wherein said intermediate column is not a final column.

An embodiment shown in FIG. 5 depicts an example indirect column-type route 500. Characteristic of indirect column routing 500 shown in FIG. 5, is a route configured to include one switch S hop and two D hops. As an example, FIG. 5 shows a network switching configuration 500 including an order of LDSLDL hops where the network is configured to forward packets from a "source" node over an L link hop, a D link hop, an S link (2 hops) to switch 150, an L Link hop, a D link hop and over an L link hop to the destination (Dest) node. As shown in FIG. 5, column 111A functions as an intermediate column and not a final column.

Figure 6:
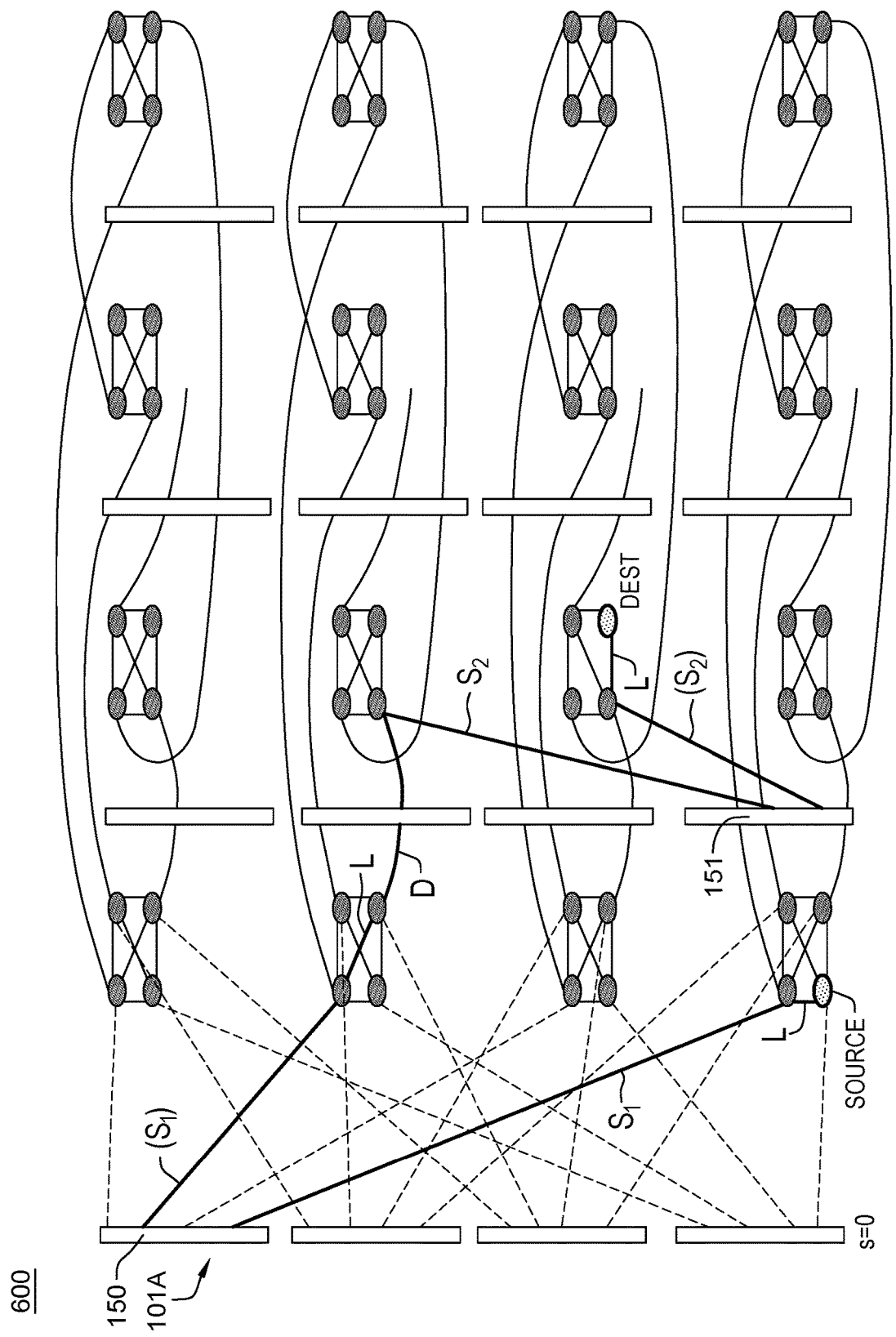
FIG. 6 depicts a second indirect route that includes 1 D link hop and 2 S link hops in the switch-connected Dragonfly network of FIG. 1 wherein said intermediate row is not a final row.

Alternatively, FIG. 6 shows an example indirect row-type route 600. Characteristic of indirect row routing 600 shown in FIG. 6, is a route configured to include two switch hops (S1 and S2) and one D hop. As an example, FIG. 6 shows a network switching configuration 600 including an order of LSLDSL hops where the network is configured to forward packets from a processor connected to a source node over a link L hop, a first switch $S_1$ link (2 hops) via a first logically associated column switch 150 associated with a row-switch position, an L link hop, a D link hop, a second $S_2$ link (2 hops) via a second column switch 151 logically associated with a row-switch position in a second column to a row switch group having a destination node, and over an L link hop to the destination (Dest) node. In the indirect route 600 shown in FIG. 6, indirect row 101A functions as an intermediate row and not a final row.

In one embodiment, for packet routing operations, the network may be configured to choose routing over an indirect path (e.g., LDSLDL) 50% of the time, and choose routing over the other indirect path (LSLDSL) 50% of time.

That is, when routing multiple packets between a source node of a first group and a destination node of a second group, packets may be alternatively routed over the both the indirect column route and indirect row routing such that, on an average, packets traverse over: 1.5 D hops, 1.5 S hops, and 3 L hops. For multiple packet routing, this alternative routing scheme over both indirect routing types is balanced since there are two times (2×) a number of L links than D or S links which enables higher sustained performance. Thus, twice as many L links are provided compared to D or S links. In an example embodiment described above with respect to FIG. 2, given six S links or six D links in an example switch node embodiment, the aggregate all-to-all bandwidth per router is four, i.e., 6/1.5=4 links of all-to-all per router which is about ⅔ the per router bandwidth by direct routing.

The all-to-all aggregate bandwidth of the indirect routing shown in switched-connected dragonfly network embodiments of FIGS. 5 and 6 is equal to the aggregate bandwidth of the prior art full two-level dragon-fly. For example, given a prior art full two-level dragon-fly network with each node having 8P, 16L and 8D links switches, an indirect route takes the form of LDLDL link hops, resulting in the D links being used twice resulting in ½ bandwidth, i.e., given 8 D links, there are 4 D links worth of bandwidth, i.e., ½ D link/socket for 2 Tier Dragonfly (without S port switch links). Given an example switched-connected dragonfly network embodiment in which a switch is configured with 8P, 12L, 6D, 6S links, there is ⅔ equivalent per router bandwidth and given the ¾ links all-to-all per socket bandwidth also results in: (⅔)*(¾)=½ D link/socket for the Switched Dragonfly network 100 of FIG. 1.

In a further embodiment, an indirect path may require 2D and 2S link hops, e.g., wherein packets may traverse a path from a source node to a destination node along a sequence of LDSLDSL hops which enables more traffic spreading, at the expense of additional hops.

In one embodiment, there may be an extra L hop optionally provided in the indirect routes at the end for fault tolerance.

Optimized Routing.

For the non-limiting example 32 port switch of FIG. 2 having 8 P, 12 L, 6D and 6 S ports of the same bandwidth. For random all-to-all-like traffic, a direct route has two L, one D and one S hops and so the random direct bandwidth is 6 (D or S) links worth of bandwidth per router. In the 2 Tier Dragonfly, the indirect random bandwidth is half the direct random bandwidth.

As it is the case that properly chosen indirect paths have ⅔'s the bandwidth of a direct path, rather than ½ as in the two tier Dragonfly, then in one embodiment, routing via indirect paths is restricted to have no more than 3 L hops. Further, as half the paths have two S and one D hop, or one S and two D hops, if there are multiple D links between each group in a row, such paths can easily be found. Examples of such paths include: 1) a path traversing SLDLDL links (e.g., go to the destination row, but then use indirect routing within the row); 2) a path traversing SLDSL links (e.g., go to an intermediate indirect row, use direct routing to get to the destination group, and then go to the destination row and router). Then the average number of hops is less than 3 L hops, 1.5 D hops (50% have one D hop and 50% have two D hops), and 1.5 S hops. Thus the ratio of indirect to direct path bandwidth is 1/1.5=⅔.

The switched dragonfly-network 100 of FIG. 1 is expandable and includes aspects for: modular growth; implementation of smaller rows, with multiple direct paths between each pair of Tier 1's; enablement of independent partitioning, made up of multiple rows; and providing good separation of compute (D0) versus I/O nodes (file system nodes) (D1) and configurable bandwidth.

Modular Growth

The switch-connected Dragonfly topology 100 as shown in FIG. 1, permits modular growth such that additional rows may be connected. A newly connected row may be connected to existing column switches without re-cabling or under-provisioning as in conventional Dragonfly networks.

In an example implementation, a switched-dragonfly network 100 having less than "T" rows may be expanded by adding a row and properly connecting the switches in the new row to the column switches. That is, the network 100 may be sized such that one or more rows already exist and a new row is added such that the nodes in the new row connect to an unused (e.g., spare) port of an existing column switch port already in the network. The switches in the new row are connected to the unused ports of a column switch which are then turned on to connect the row to the network without modifying the existing cabling of the original network. Unlike conventional Dragonfly networks, no existing cables are required to be moved and the existing L, D and S ports may be fully populated for full bisection. As an example, for smaller systems with T/2 rows, two switches may be connected from each row to the same column switch.

The switched-Dragonfly network 100 may be configured to include smaller number of rows, with multiple direct paths between each pair of one-level dragonfly network (Tier 1's). For example, a row comprising one-level switched-dragonfly switch having 8P, 11L, 6D has 12 Tier 1's (96 sockets) and 6D links between each pair of Tier 1's resulting in e.g., 1152 sockets/row.

Figure 7:
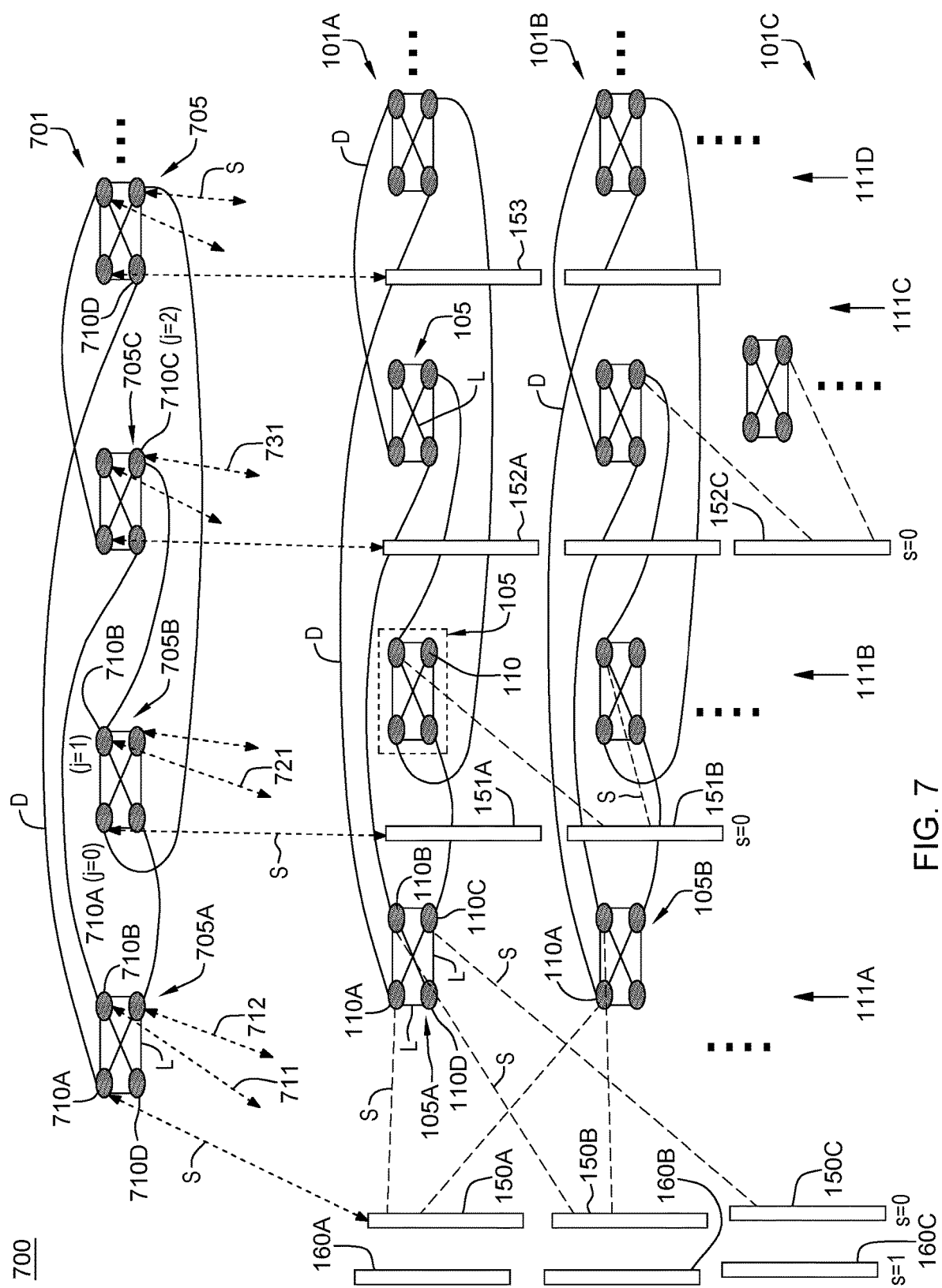
FIG. 7 depicts an example expansion of an existing switched-connected Dragonfly network by adding and connecting a two-level dragonfly network row.

FIG. 7 depicts an example expansion of an existing switched-connected Dragonfly network 700 such as the network 100 shown in FIG. 1, by adding and connecting a two-level dragonfly network row 701. As shown, added row 701 includes groups 705 each group 705 having all interconnecting local links L and all inter-group global D link cabling in the row. To add the row 701 to the network, all that needs to be performed is the addition of switch link S cabling for connecting each switch node 710 of a group 705 to an existing column switch port available at the corresponding column switch in a corresponding column. For example, a switch port at switch 710A of the group 705A in the row 701 being added only requires an S link connection to the available column S link switch port at column switch 150A. Similarly, switch port at switch 710B of the group 705A in row 701 being added only requires a connection 711 to the available column S link switch port at column switch 150B, and switch port at switch 710C of the group 705A in row 701 being added only requires a connection 712 to the available column S link switch port at column switch 150C, etc. Remaining S link cable connections from these column switches to other groups within the same column is additionally required in the manner as discussed above with respect to FIG. 1.

This process of adding additional cabling to connect switch nodes to column switches is repeated for each switch node at each group 705 of the row being added. For example, a switch port at switch 710A of the group 705B in row 701 being added only requires adding an S link connection to the available column S link switch port at column switch 151A associated with row 101A column 111B, and a switch port at switch 710B of the group 705B in row 701 being added only requires adding an S link connection 721 to the available column S link switch port at column switch 151B associated with row 101B column 111B, etc. Similarly, for group 705C where, for example, switch port at switch 710C of the group 705C in row 701 being added only requires adding an S link connection 731 to the available column S link switch port at column switch 152C associated with row 101C column 111C, etc.

Further, in connection with the adding of the row 701 of multiple groups of row switches to the network, alternatively, switch link S cabling may be provided for connecting each switch 710A-710D of a group 705 to a plane of column switches in the same column. Each switch 710A-710D's S port k=0, 1, . . . , S−1 is connected to a column switch at planes s=0, s=1, . . . , s=S−1, respectively, of column switches available at the corresponding column.

For example, the process of adding additional cabling may be followed to connect row switches to column switches of a plane of column switches in like manner as described herein above with respect to embodiments of FIGS. 1C-1E, e.g., at a planes s=0, 1, . . . , s=S−1. For example, an S switch port k=0 at switch 710A (j=0) of the row switch group 705B in row 701 being added may alternatively require adding an S link connection to the available column switch port at a parallel column switch of another plane, e.g., a column switch plane s=1 (not shown), associated with the associated logic column switch 151A for that row switch (at j=0). Likewise, a switch port at row switch 710B (j=1) of the group 705B in the row 701 being added to the network requires adding an S-link connection 721 for connecting to the available column switch port at column switch 151B logically associated for that column 111B and row switch (at j=1), or alternatively at a switch port of a parallel column switch at a parallel column switch plane s=1 (not shown) associated with column switch 151B. Similarly, for group 705C where, for example, a switch port at switch 710C (j=2) of the group 705C in row 701 being added requires adding an S-link connection 731 either to the available column switch port at plane s=0 of column switch 152C logically associated for that column 111C and row switch (at j=2), or alternatively to a port of a parallel column switch 151C at a column switch plane, e.g., s=1, parallel to columns switch 152C plane s=0 at column 111C.

Partitioning

The switch-connected Dragonfly topology 100 as shown in FIG. 1 further permits simultaneous network configurations of independent partitions, e.g., made up of multiple rows in one embodiment. For example, given a switched-Dragonfly network 100 having 32 Rows and (×1152 sockets/row=36,864 sockets), the switched-dragonfly network 100 may be configured to provide isolated partitions. In one embodiment, partitioning may include configuring jobs to run on multiples of rows with no interference between jobs. For example, the network 100 may be partitioned to run one job using 16 rows, and one job may be configured to run using four rows, and two jobs may be run on 2 rows each, and eight jobs may be run on one row each. This is compared to a row dragonfly and column dragonfly that do not yield non-interfering multi-row partitions (e.g., 8P, 12L, 6Dx, 6Dy where Dx and Dy indicate two-dimensional D link connections among groups of different rows).

As a further example, a switched-dragonfly network 100 having 32 rows may be flexibly partitioned into one 16 row job, two 4 row jobs, and eight 1 row jobs. The column switches 150 ensure that traffic within jobs can be entirely contained within the appropriate rows and ports on the column switches. For a single level fat tree of column switches, this ensures that the traffic from one job does not affect the traffic from another job. If the jobs are less than a row, then there may be interference between jobs in the same row with indirect row routing, but this is less of a scalability problem since the rows may be constrained in size.

Additional partitioning schemes are available. For example, one or more rows may be cut along vertical columns. For example, when partitioning, it may be desired to cut rows first to provide full all-to-all bandwidth within the partition. If cutting columns first, all-to-all or bisection bandwidth may be reduced.

Deadlock Free Routing

A deadlock situation is a situation in the switched network in which packets are allowed to hold some resources while requesting others, so that the dependency chain forms a cycle. Then, all these packets must wait.

A Virtual Channel (VC) is a communications track between two nodes giving the bandwidth needed for a virtual connection across the network. Every packet is assigned a VC. In one embodiment, a VC may include a receive buffer associated with the port at the switch. For each switch port there may be four (4) virtual channels assigned. Virtual channels may be devised to solve a deadlock avoidance problem, but they can be also used to improve network latency and throughput. In a 2-Tier Dragonfly such as IBM's Torrent, direct paths have the form LDL and indirect paths have the form LDLDL. It has been shown that this requires two Virtual Channels (VCs) per D link and three VCs per L link to avoid deadlock.

In the switched-Dragonfly network 100 of FIG. 1, it is assumed that a direct path consists of one S (column switch) path (two hops one from the source row to the column switch and one from the column switch to the destination row). Such a path may be of the form SLDL, LSDL, LDSL, or LDLS (some hops may not be needed). An indirect path may require one S path and two D hops, two S paths and one D hop, or two S paths and two D hops (some indirect paths may not require all such hops). The latter path type may be represented as SLDLSLDL which has up to four L hops.

To avoid deadlocks, multiple receive buffers may be associated with each L, D, S switch port. Further, a VC assignment rule is enforced that is acyclic. This can be done with four VCs per class of service (CoS). Thus, if there are two classes of service, there would be 8 VCs per port. The VCs may be numbered according to the following scheme: S1, . . . , S4, L1, . . . , L4 and D1, . . . , D4.

Routing of packets will follow an ordering hierarchy according to:
S1<L1<D1<S2<L2<D2<S3<L3<D3<S4<L4<D4

Whenever a hop is made, the next highest VC is used to prevent deadlocks. A VC assignment rule is provided for several types of routing paths as follows:

Direct SLDL path: S1 L1 D1 L2
Direct LSDL path: L1 S2 D2 L3
Direct LDSL path: L1 D1 S2 L2
Direct LDLS path: L1 D1 L2 S3
Indirect SLDLSLDL path: S1 L1 D1 L2 S3 L3 D3 L4
Indirect SLDSLDL path: S1 L1 D1 S2 L2 D2 L3
Indirect SLDSL path: S1 L1 D1 S2 L2
Indirect SLDLD path: S1 L1 D1 L2 D2 L3

While at most two S paths or two D hops are ever used in the above routes, at most, three S VCs per port and 3 D VCs per port are required. VCs S4 and D4 are not required. Four L VCs per port are required.

S Port Cabling

In the embodiments described, the S ports from row i, row switch j in group g, and port k, (labeled as S(i,g,j,k)), are mapped to column switches. Among all the rows, each columns of group g are cabled the same way. For illustration purposes, it is assumed that the S ports are fully populated. Coming out of a group in one row are N=J*S ports, where the maximum J (local group size) is L+1. Each S port connects to a different column switch in the same group, so there are N column switches for the same group g. These column switches are labeled as C(g,l,s), where l=0, 1, . . . , J−1, and s=0, 1, . . . , S−1. These column switches can be viewed as in different planes, and there are S such planes. One way of cabling the switches is, for a fixed j and k, to have all switches in the different rows connected to the same column switch. For example, assign switch S(i,g,j,k) to column switch C(g,l=j,s=k) for each i. FIGS. 1B to 1E illustrate these connections. For Example, FIG. 1C shows that there are J*S (J=4) column switches in each column, where S is the total number of S ports on each row switch. FIG. 1C shows cabling for column 0, row switch j in group 0 for any row i. All row switches'S port k=0 are connected to corresponding column switch C(g=0, l=j, s=0). FIG. 1D shows the same cabling mechanism for k=1, and FIG. 1E for k=S−1. This cabling scheme has a disadvantage that if a row router j in, say group 0 of row i is down, then direct paths starting with an S hop cannot be made from any other row's router j of group 0 to row i (since router j of group 0 in row i is down). While arbitrary cablings can be implemented, in a preferred embodiment, 1) there is enforced regularity such that, for a given row, the switches in a Tier 1 group are cabled identically to the column switches of other Tier 1 groups in that row; and 2) for a given router in a row, the switch ports connect to other switches in other rows uniformly.

To connect column switches C(g,l,s) to row switch ports S(i,g,j,k), the following pseudo-code in C/C++ programming language can be used in one embodiment:

```
s = k                  // keep the same row switch port k in the same
                          column switch plane
l = ((i*M)+j) % J      // % is the integer modulo operation
```

For example, with M=0, l=j, this is the same connection as FIG. 1B. Other choices of M are M=1 and M=(−1) (not shown). In general, M can be an integer number that is relative prime to J other than the M=0 case. Each s plane of column switches can use a different M, or can cycle through a limited number of choices of M. The same M is kept across different columns.

When the number of rows exceeds J, repetition will occur. Different M should be uses when the row number exceeds J. A formula is given below:

```
s = k
i1 = i % J
i2 = int(i / J)   // int( ) truncates the integer division to an integer number
```

Letting M(i) be a list numbers that are relative prime to J $$l = (i1*M(i2)+j) \% J.$$

Plane Switching, for 2-Way SMPs

As described above, if nodes 110 are 2-way SMPs and each socket has a port to a router, for scale, one can consider dual planes of networks where all the socket 0's of the SMPs are on network plane 0, e.g., a partition 0, and all the socket 1's of the SMP are on network plane 1, e.g., a partition 2. If the planes operate independently, then there is a potential fault-tolerance issue. Suppose on SMP i, the router for plane 0 is down, and on SMP j, the router for plane 1 is down. To get traffic onto the network, SMP i uses its plane 1 router but such traffic cannot be delivered to SMP j since its router for plane 1 is down.

Figure 2B:
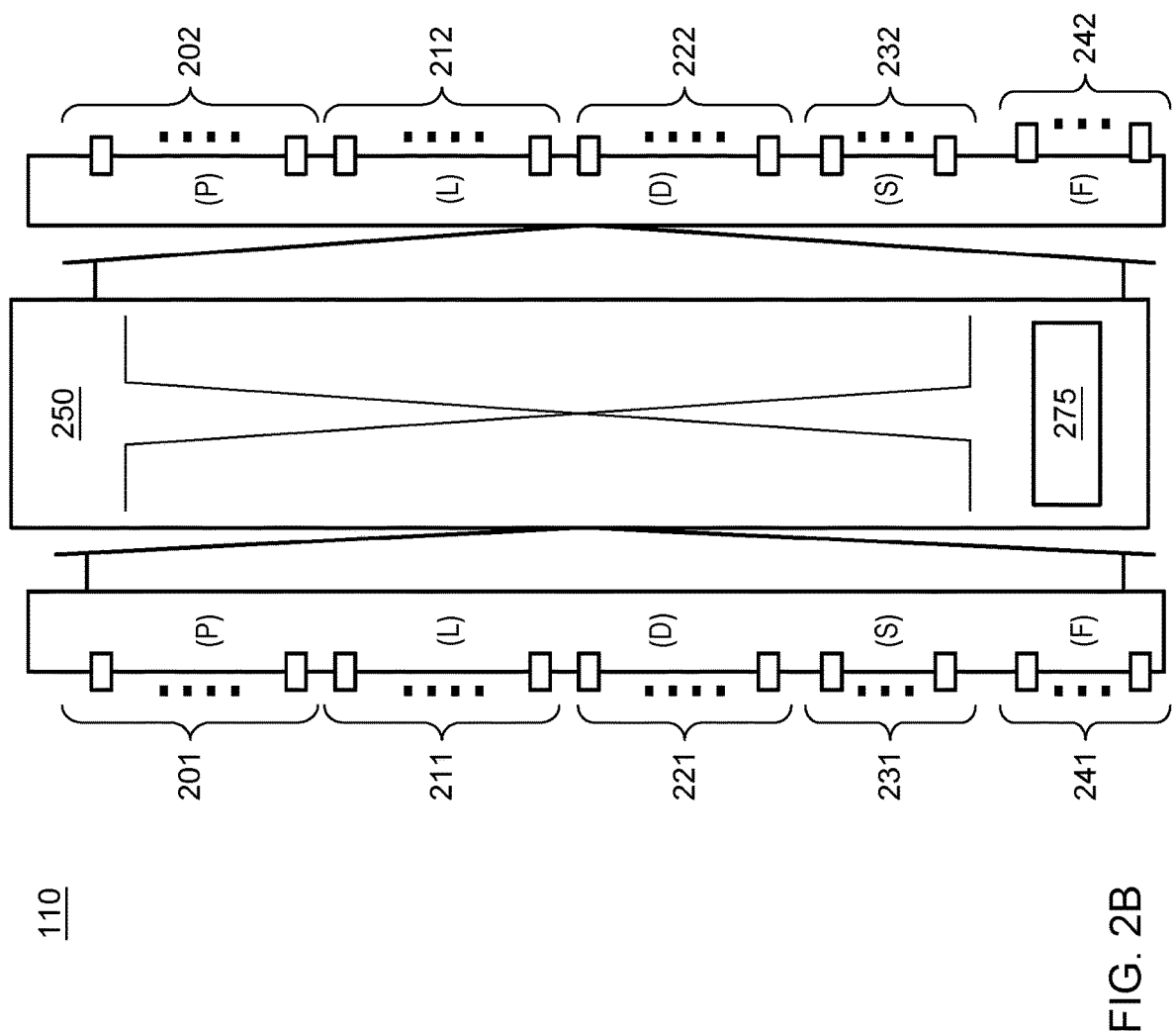
FIG. 2B shows the switch of FIG. 2A including additional multiple input fault tolerance I/O ports as a mechanism for switching between network planes according to one embodiment.

In one embodiment, a further fault tolerance port (F port) is provided that can switch traffic between planes. FIG. 2B shows the switch of 110 FIG. 2A including additional multiple input fault tolerance ports (F ports) 241 and corresponding output fault tolerance ports (F ports) 242 as the mechanism for switching between planes. Each router in plane 0 connects to the corresponding router in plane 1 through F ports and cables.

At most, one plane switch per route is permitted: indirect paths can avoid faulty routers on intermediate hops, the plane switching is only required for faults at the destination routers. In view of the additional port, the hierarchical VC ordering is as follows:
S1<F1<L1<D1<S2<F2<L2<D2<S3<F3<L3<D3<S4<F4<L4<D4

As a non-limiting example, an indirect route traversing links according to an order S1 L1 D1 L2 S3 L3 D3 L4 that requires a plane switch could insert an F hop at any valid point in the route, e.g., S1 F1 L1 D1 L2 S3 L3 D3 L4 or S1 L1 D1 F2 L2 S3 L3 D3 L4.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A switching network comprising:
   a plurality of groups of row switches organized according to multiple rows and columns, each row comprising multiple groups of row switches connected to form a two-level dragonfly network;
   a plurality of column switches for interconnecting groups of row switches along columns, one or more column switches associated with a corresponding group of row switches in a row, and the plurality of column switches forming multiple planes of column switches, a single plane of column switches corresponding to a respective column of row switch groups, and
   each group of said plurality of groups of row switches along a column comprising:
   a plurality of multi-port switches, each switch enabling routing of packets between any switch within said group over a local L path link interconnecting said multi-port switches within the group, each multi-port switch enabling routing of packets between any group among the plurality of groups along a row over a global D path link interconnecting said groups to form said two-level dragonfly network, and multiple additional S switch ports on each row switch of each group, a respective S switch port directly connecting to a respective different independent column switch of said plurality of the column switches of a plane via a respective S path link, the respective additional S switch port on each row switch at a same logical location in each group connecting to a same column switch over a corresponding switch S path link.

2. The switching network of claim 1, wherein said network is configured to route packets over a direct route from a source switch to a destination switch, said direct route enabling a routing packets over a path comprising one D path link and over one S path link, an S path link comprising one of:
   a first link from a switch port of a row switch of a group in a first row and column connected to a column switch associated with the same logical location of said row switch and said column, and a second link from said associated column switch connected to a corresponding row switch at a same logical location of a group in a different row of said column having said destination switch; or
   a first link from a switch port of a row switch of a group having said source switch in a first row and a column connected to a column switch associated with the same logical location of said row switch and said column, and a second link from said associated column switch connected to a corresponding row switch at the same logical location of a group in said different row of said column.

3. The switching network of claim 1, wherein said network is configured to route packets over an indirect route from a source switch to a destination switch, said indirect route enabling a routing packets over one of:
   a first indirect path having two D path links and one S path link, or
   a second indirect path having one D path link and two S path links,
   wherein for said first indirect path having said two D path links and one S path link, said one S path link comprises:
   a first link from a switch port of a row switch of a group in a first row and column connected to a column switch associated with the same logical location of said row switch and the column, and a second link from said associated column switch connected to a corresponding row switch at the same logical location of a group in a different row of said column; and
   for said second indirect path having said one D path link and two S path links, a first S path link comprises:
   a first link from a switch port of a row switch of a group having said source switch in a first row and first column connected to a column switch associated with the same logical location of said row switch and said first column, and a second link from said associated column switch connected to a corresponding row switch at the same logical location of a group in a different row of said first column; and
   a second S path link comprises:
   a first link from a switch port of a row switch of a group in said different row of a second column connected to a column switch associated with a same logical location of said further row switch and said second column, and a second link from said associated second column switch connected to a corresponding row switch at the same logical location of a group in a row having said destination switch of said second column.

4. The switching network of claim 3, further comprising:
   a plurality of receive buffers associated with each port of each said multi-port switch, each said plurality of receive buffers providing multiple virtual channels (VC) for avoiding deadlocks while routing packets in said switching network, wherein a VC is assigned according to an acyclic assignment rule.

5. The switching network of claim 1, configured to expand by adding an additional row without a loss of bandwidth, wherein a row to be added comprises a two-level dragonfly network comprising multiple groups of interconnected row switches, and each group of the added row aligned with groups and respective one or more column switches of a respective column, a row switch group of said added row associated with a column being connected to an available port at an existing one or more column switches of said column by a corresponding added S path link,
   wherein a row switch at a same location in each said group of said added row connects to a same existing column switch associated with that column over a corresponding switch S path link.

6. The switching network of claim 1, configured as one or more independent partitions, each independent partition comprising a single row or multiple rows of two-level dragonfly network with said respective multiple column switches.

7. The switching network of claim 1, wherein each multi-port switch comprises connections to one or more processor nodes, a processor node comprising a symmetric multiprocessor (SMP) wherein a socket in the SMP has a corresponding port into the switching network, said switching network organized according to first and second planes for doubling a switched network bandwidth for said processor.

8. The switching network of claim 7, wherein each multi-port switch comprises a port for switching traffic between said planes along a given direct or an indirect route responsive to determining a fault at a destination switch.

9. A method of operating a switching network comprising:
configuring, using a control element, row switch elements of a switching network to route one or more packets from a source row switch to a destination row switch, said switched network comprising:
a plurality of groups of row switches organized according to multiple rows and columns, each row comprising multiple groups of row switches connected to form a two-level dragonfly network;
a plurality of column switches for interconnecting groups of row switches along columns, one or more column switches associated with a corresponding group of row switches in a row, and the plurality of column switches forming multiple planes of column switches, a single plane of column switches corresponding to a respective column of row switch groups, and each group of said plurality of groups of row switches along a column comprising:
a plurality of multi-port switches, each switch enabling routing of packets between any switch within said group over a local L path link interconnecting said multi-port switches within the group, each multi-port switch enabling routing of packets between any group among the plurality of groups along a row over a global D path link interconnecting said groups to form said two-level dragonfly network, and multiple additional S switch ports on each row switch of each group, a respective additional S switch port directly connecting to a respective different independent column switch of said plurality of the column switches of a plane via a respective S path link, the respective additional S switch port on each row switch at a same logical location in each group connecting to a same column switch over a corresponding switch S path link, and
routing one or more packets from said source switch node to said destination switch node over one of: a direct route or an indirect route, said routing over said direct or indirect routes including routing through one or more said column switches over corresponding switch S path links.

10. The method of claim 9, wherein said routing of one or more packets from a source switch to a destination switch over said direct route comprises:
routing said one or more packets to traverse over a path comprising one D path link and over one S path link, an S path link comprising one of:
a first link from a switch port of a row switch of a group in a first row and column connected to a column switch associated with the same logical location of said row switch and said column, and a second link from said associated column switch connected to a corresponding row switch at a same logical location of a group in a different row of said column having said destination row switch; or
a first link from a switch port of a row switch of a group having said source row switch in a first row and column connected to a column switch associated with the same logical location of said row switch and said column, and a second link from said associated column switch connected to a corresponding row switch at the same logical location of a group in said different row of said column.

11. The method of claim 9, wherein said routing of one or more packets from a source switch to a destination switch over said indirect route comprises:
routing said one or more packets to traverse over a first indirect path having two D path links and one S path link, said routing said one or more packets over said first indirect path comprises:
configuring, using said control element, said one S path link as a first link from a switch port of a row switch of a group in a first row and a column for connection to a column switch associated with the same logical location of said row switch and said column, and a second link from said associated column switch for connection to a corresponding row switch at the same logical location of a group in a different row of said column.

12. The method of claim 11, wherein said routing of one or more packets from a source switch to a destination switch over said indirect route comprises:
routing said one or more packets to traverse over a second indirect path having one D path link and two S path links, said routing over said two S path links comprising:
configuring, using said control element, a first S path link as a first link from a switch port of a row switch of a group having said source switch in a first row and first column for connection to a column switch associated with the same logical location of said row switch and said first column, and a second link from said associated column switch for connection to a corresponding row switch at the same logical location of a group in a different row of said first column; and
further configuring, using said control element, a second S path link as a first link from a switch port of row switch of a group in said different row of a second column to a column switch associated with a same logical location of said row switch and said second column, and a second link from said associated second column switch for connection to a corresponding row switch at the same logical location of a group in a row having said destination switch of said second column.

13. The method of claim 12, wherein multiple packets are routed from a source switch to a destination switch, said method comprising:
configuring, using said control element, a routing of packets over said first indirect path for about 50% of the time and a routing of packets over said second indirect path for about 50% of the time, wherein said routing balances link resources.

14. The method of claim 12, wherein each multi-port switch comprises connections to one or more processor nodes, a processor node comprising a symmetric multiprocessor (SMP), wherein a socket in the SMP has a corresponding port into the switching network, said method further comprising:

configuring, using said control element, said switching network as comprising first and second planes for doubling a switched network bandwidth for a processor.

15. The method of claim 14, further comprising:
detecting, by said control element, a fault at a destination switch; and
switching, by said control element, packet routing traffic between said first and second planes along a given direct or an indirect route responsive to said detecting.

16. The method of claim 12, wherein said switching network further comprises a plurality of receive buffers associated with each port of each said multi-port switch, each said plurality of receive buffers providing multiple virtual channels (VC) for avoiding deadlocks while routing packets in said switching network, said method further comprising: assigning a VC for routing a packet according to an acyclic assignment rule.

17. The method of claim 9, further comprising:
expanding said switching network by adding an additional row without loss of bandwidth, wherein a row to be added comprises a two-level dragonfly network comprising multiple groups of interconnected row switches, and each group of the added row aligned with groups and respective one or more column switches of a respective column; and
connecting a row switch group of said added row associated with a column being connected to an available port at an existing one or more column switches of said column by a corresponding added S path link,
wherein a row switch at a same location in each said group of said added row connects to a same existing column switch associated with that column over a corresponding switch S path link.

18. The method of claim 9, further comprising:
configuring, using said control element, one or more independent partitions in said switching network, each independent partition comprising a single row or multiple rows of two-level dragonfly network with said respective multiple column switches.

* * * * *